United States Patent
Kang et al.

(10) Patent No.: US 11,265,877 B2
(45) Date of Patent: Mar. 1, 2022

(54) METHOD FOR SELECTING TRANSMISSION RESOURCE FOR TRANSPORT BLOCK BY USER EQUIPMENT IN WIRELESS COMMUNICATION SYSTEM AND APPARATUS THEREFOR

(71) Applicant: LG ELECTRONICS INC., Seoul (KR)

(72) Inventors: Sungyong Kang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 16/617,488

(22) PCT Filed: May 28, 2018

(86) PCT No.: PCT/KR2018/006047
§ 371 (c)(1),
(2) Date: Nov. 26, 2019

(87) PCT Pub. No.: WO2018/217073
PCT Pub. Date: Nov. 29, 2018

(65) Prior Publication Data
US 2020/0187207 A1    Jun. 11, 2020

Related U.S. Application Data

(60) Provisional application No. 62/511,360, filed on May 26, 2017.

(51) Int. Cl.
*H04W 72/12*    (2009.01)
*H04W 72/04*    (2009.01)

(52) U.S. Cl.
CPC ....... *H04W 72/0453* (2013.01); *H04W 72/12* (2013.01)

(58) Field of Classification Search
CPC .................... H04W 72/0453; H04W 72/12
See application file for complete search history.

(56) References Cited

U.S. PATENT DOCUMENTS

| 2011/0171989 A1 | 7/2011 | Kim et al. |
| 2014/0080501 A1 | 3/2014 | Lee et al. |

(Continued)

FOREIGN PATENT DOCUMENTS

| WO | 2014133320 | 9/2014 |
| WO | 2016021962 | 2/2016 |

(Continued)

OTHER PUBLICATIONS

PCT International Application No. PCT/KR2018/006047, Written Opinion of the International Searching Authority dated Sep. 10, 2018, 20 pages.

(Continued)

*Primary Examiner* — Angel T Brockman
(74) *Attorney, Agent, or Firm* — Lee, Hong, Degerman, Kang & Waimey PC

(57) ABSTRACT

Disclosed are a method for selecting a transmission resource for a transport block (TB) by a user equipment (UE) in a wireless communication system and an apparatus therefor according to various embodiments. Specifically, disclosed are a method for selecting a transmission resource for a transport block (TB) by a user equipment (UE) in a wireless communication system and an apparatus therefor, the method comprising the steps of: arbitrarily selecting one frequency section from among multiple frequency sections divided from a system band at predetermined frequency intervals, and determining a first transmission resource for (Continued)

transmitting the transport block (TB) on the basis of the arbitrarily-selected frequency section; and transmitting the transport block, using the determined first transmission resource, wherein a guard band, which is a frequency band which is not selected as the first transmission resource, is formed in the arbitrarily-selected frequency section.

12 Claims, 12 Drawing Sheets

(56) References Cited

U.S. PATENT DOCUMENTS

2014/0126440 A1    5/2014   Frank et al.
2016/0100430 A1    4/2016   Dabeer et al.

FOREIGN PATENT DOCUMENTS

| WO | 2016164670 | 10/2016 |
| WO | 2016182291 | 11/2016 |
| WO | 2017058427 | 4/2017 |

OTHER PUBLICATIONS

European Patent Office Application Serial No. 18806312.7, Search Report dated Dec. 14, 2020, 19 pages.

FIG. 5
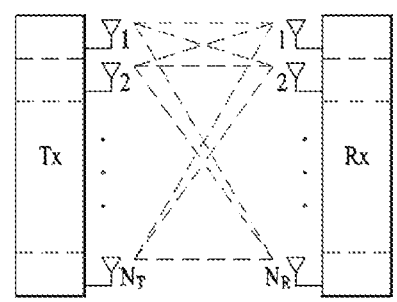
(a)
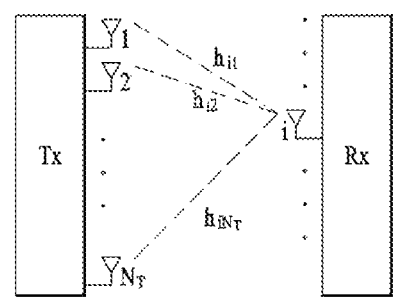
(b)

METHOD FOR SELECTING TRANSMISSION RESOURCE FOR TRANSPORT BLOCK BY USER EQUIPMENT IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006047, filed on May 28, 2018, which claims the benefit of U.S. Provisional Application No. 62/511,360, filed on May 26, 2017, the contents of which are all hereby incorporated by reference herein in their entirety.

TECHNICAL FIELD

The present disclosure relates to a wireless communication system, and more particularly, to a method of selecting a transmission resource for a Transport Block (TB) by a User Equipment (UE) and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-To-Device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to Machine-To-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Task

One technical task of the present disclosure is to minimize out-band leakage between adjacent frequency bands in a manner of randomly selecting a prescribed frequency band from a plurality of frequency bands and selecting a transmission resource based on the randomly selected frequency band by forming a guard band in the randomly selected frequency band.

One technical task of the present disclosure is to secure an RF-tuning time required for switching an ON section of a transmission amplifier for different frequency bands in a manner that a UE randomly selects a transmission timing between a first transmission resource and a second transmission resource so that the transmission timing is equal to or greater than a preset interval.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to one embodiment, a method of selecting a transmission resource for a transport block (TB) by a user equipment (UE) in a wireless communication system may include randomly selecting a single frequency band from a plurality of frequency bands generated from dividing a system band by a preset frequency interval and determining a first transmission resource to transmit the transport block based on the randomly selected frequency band and transmitting the transport block using the determined first transmission resource, and the randomly selected frequency band includes a guard band which is a frequency band in which the first transmission resource is not selected.

According to one example, the guard band may be formed by restricting a size of the first transmission resource into a size smaller than that of the single frequency band.

A size of the first transmission resource may use a size of a resource block as a unit and the guard band may be formed by restricting the size of the first transmission resource into a multiple of a prime number or a multiplication of multiples of a plurality of prime numbers.

A plurality of the frequency bands may include a frequency band having the size of the first transmission resource restricted and a frequency band having the size of the first transmission resource not restricted.

A plurality of the frequency bands may be configured in advance in a manner that a frequency band having the size of the first transmission resource restricted and a frequency band having the size of the first transmission resource not restricted cross with each other.

The first transmission resource may include two resource blocks for a control information channel including data transmission related scheduling information.

The method may further include randomly selecting a single frequency band from a plurality of the frequency bands and determining a second transmission resource to transmit a transport block equal to or different from the former transport block based on the randomly selected frequency band, and transmission timings for the first and second transmission resources may be randomly selected.

The transmission timing of the first transmission resource and the transmission timing of the second transmission resource may be randomly selected so as to have an in-between time interval equal to or greater than a preset interval.

If an interval between the transmission timings of the first and second transmission resources is smaller than a preset interval, the second transmission resource may be determined within a frequency band equal to the randomly selected frequency band for the first transmission resource.

If an interval between the randomly selected transmission timing of the first transmission resource and the randomly selected transmission timing of the second transmission resource is smaller than a preset interval, the user equipment may randomly select the transmission timing of the first transmission resource and the transmission timing of the second transmission resource iteratively until the interval between the transmission timing of the first transmission resource and the transmission timing of the second transmission resource becomes equal to or greater than the preset interval.

The preset interval may be determined based on a Radio Frequency (RF) tuning time.

A plurality of the frequency bands and the guard band may be determined by a control signal of a physical layer or a higher layer signal transmitted from a base station.

And, the user equipment may set a bandwidth corresponding to the randomly selected frequency band as a transmission bandwidth only.

According to another embodiment, a method of selecting a transmission resource for a transport block (TB) by a user equipment (UE) in a wireless communication system may include determining a first transmission resource for transmitting a first Transport Block (TB) and a second transmission resource for transmitting a second transport block respectively based on a frequency band selected from a plurality of frequency bands generated from dividing a system band by a preset frequency interval and transmitting the first transport block and the second transport block based on the determined first transmission resource and the determined second transmission resource, and a transmission timing for the first transmission resource and a transmission timing for the second transmission resource may be randomly selected so as to have an in-between time interval equal to or greater than a preset interval. Or, according to an embodiment of the present disclosure, the processor is configured to receive a user input to switch the drive mode from an autonomous mode to a manual mode, or to switch from a manual mode to an autonomous mode.

Advantageous Effects

The present disclosure according to various embodiments can prevent out-band leakage between adjacent frequency bands in a manner of randomly selecting a prescribed frequency band from a plurality of frequency bands and selecting a transmission resource based on the randomly selected frequency band by forming a guard band in the randomly selected frequency band.

And, the present disclosure can secure an RF-tuning time required for switching an ON section of a transmission amplifier for different frequency bands in a manner of randomly selecting a transmission timing between a first transmission resource and a second transmission resource so that the transmission timing is equal to or greater than a preset interval.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5 is a view illustrating the configuration of a wireless communication system having multiple antennas;

BEST MODE FOR DISCLOSURE

Figure 1:
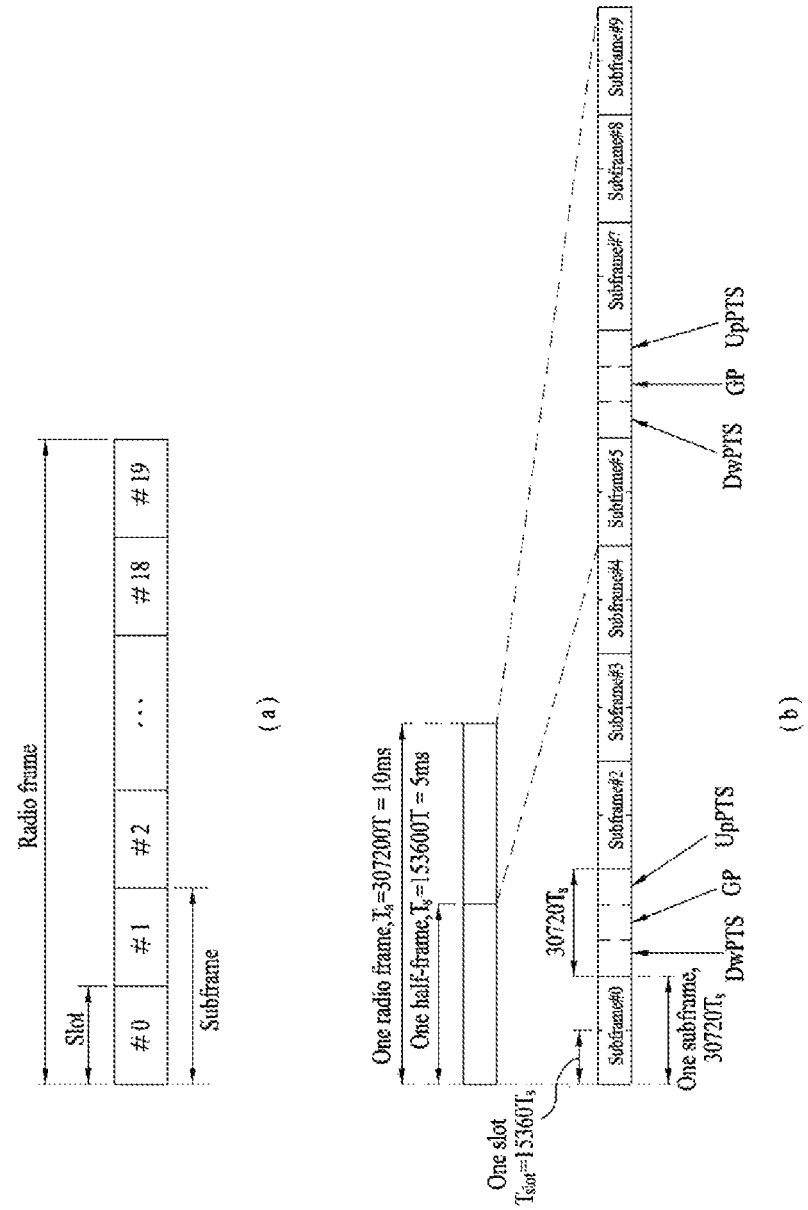
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS.

The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
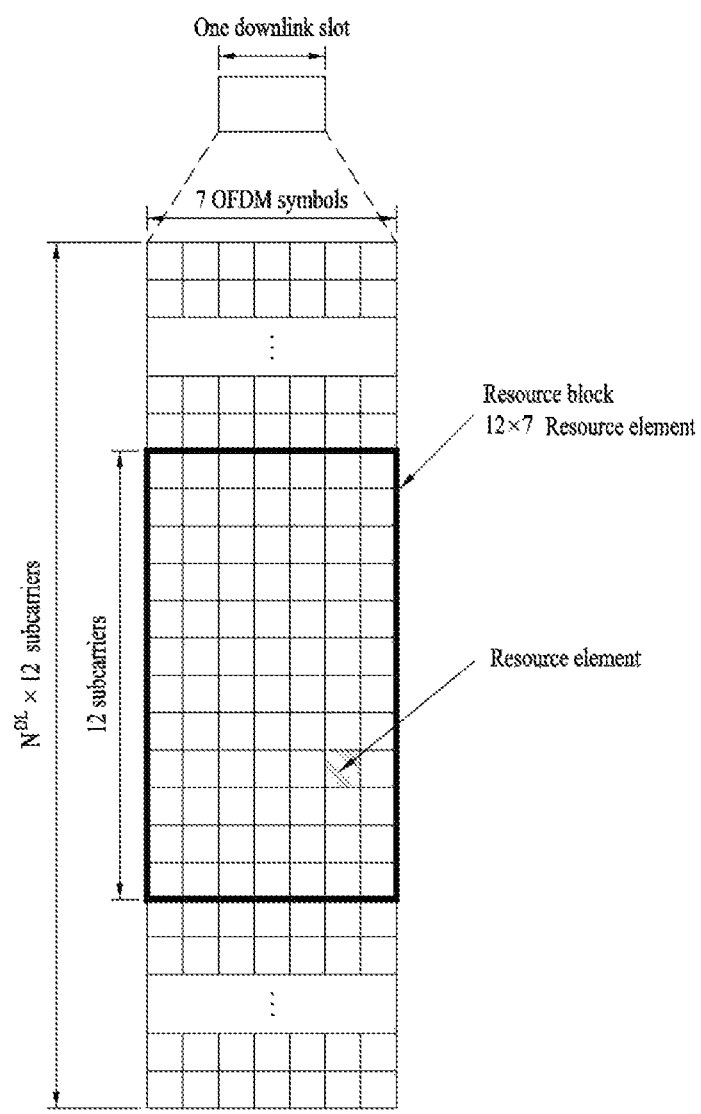
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
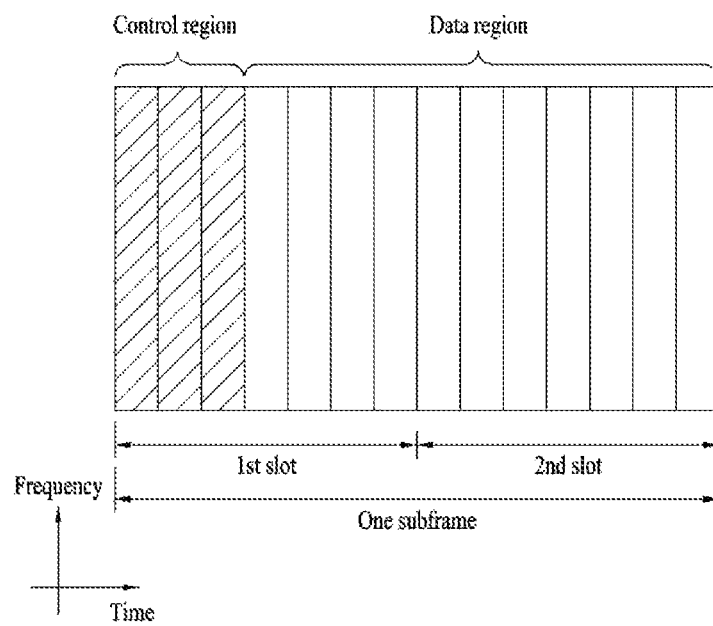
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
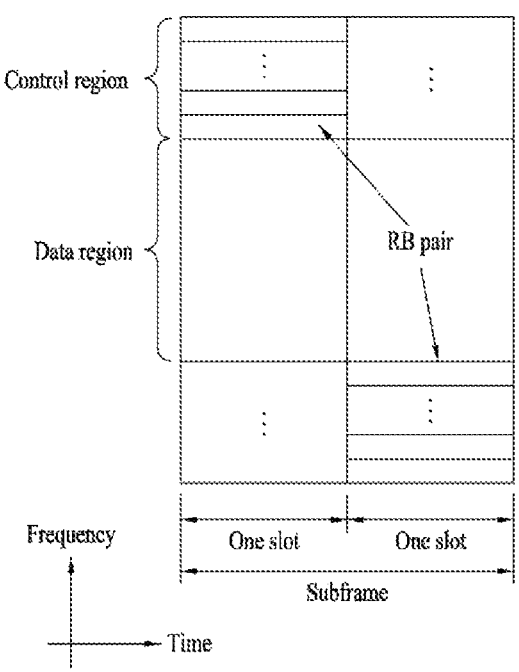
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s=[s_1, s_2, \ldots, s_{N_T}]^T \quad [\text{Equation 2}]$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad [\text{Equation 3}]$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad [\text{Equation 4}]$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad [\text{Equation 5}]$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1, y_2, \ldots, y_{N_R}]^T \quad [\text{Equation 6}]$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1}, h_{i2}, \ldots, h_{iN_T}] \quad [\text{Equation 7}]$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ w_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad [\text{Equation 8}]$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1, n_2, \ldots, n_{N_R}]^T \quad [\text{Equation 9}]$$

Through the above-described mathematical modeling, the received signals can be expressed as follows.

$$y = \quad [\text{Equation 10}]$$

$$\begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank$^{rank(H)}$ of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
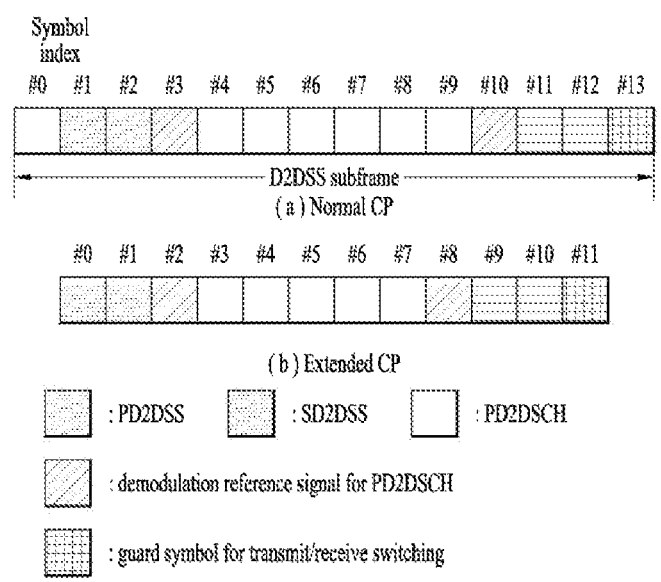
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
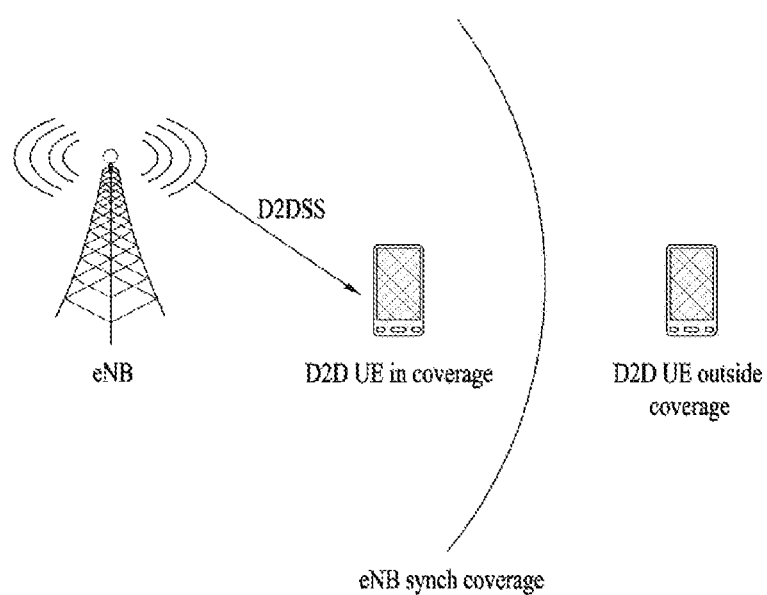
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
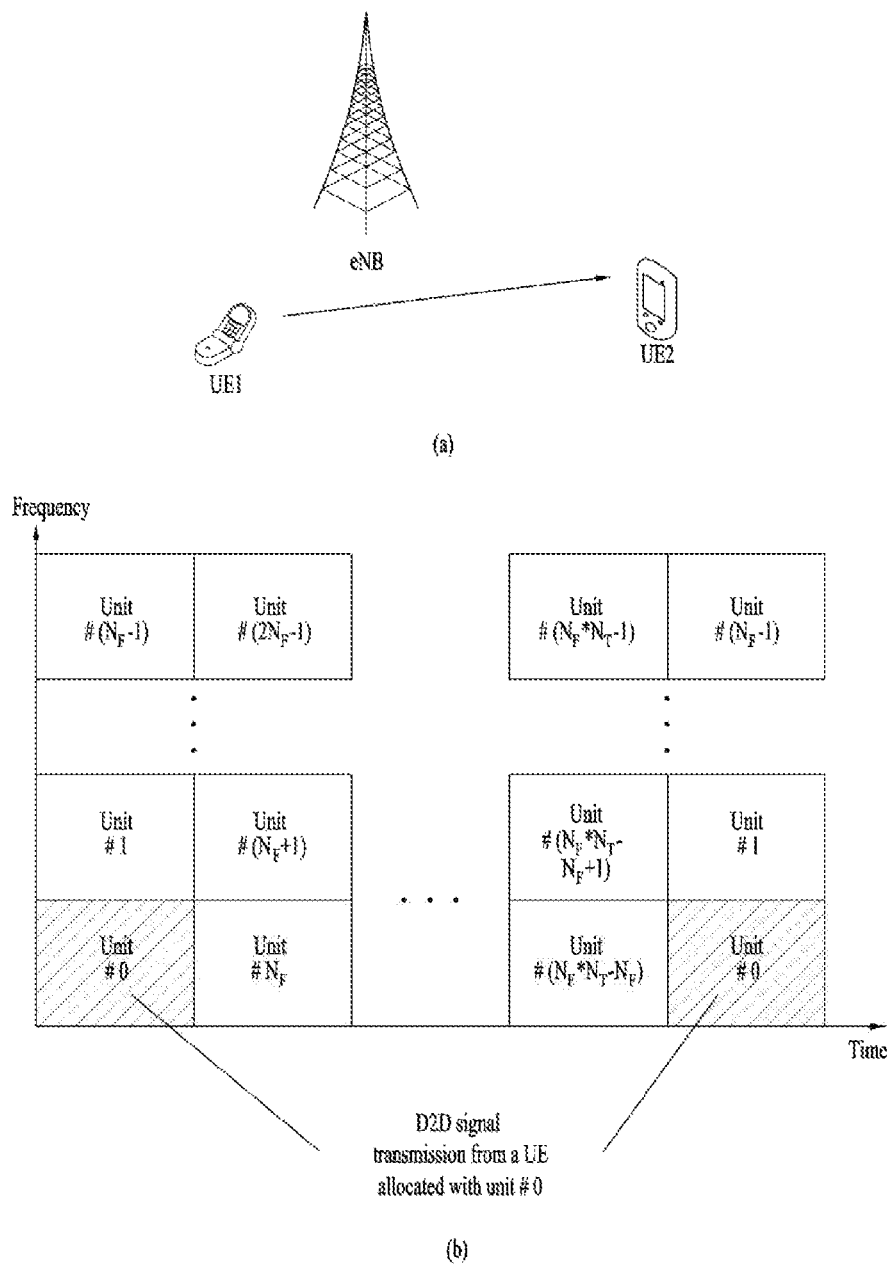
FIG. 8 is a view illustrating an exemplary D2D resource pool for D2D.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
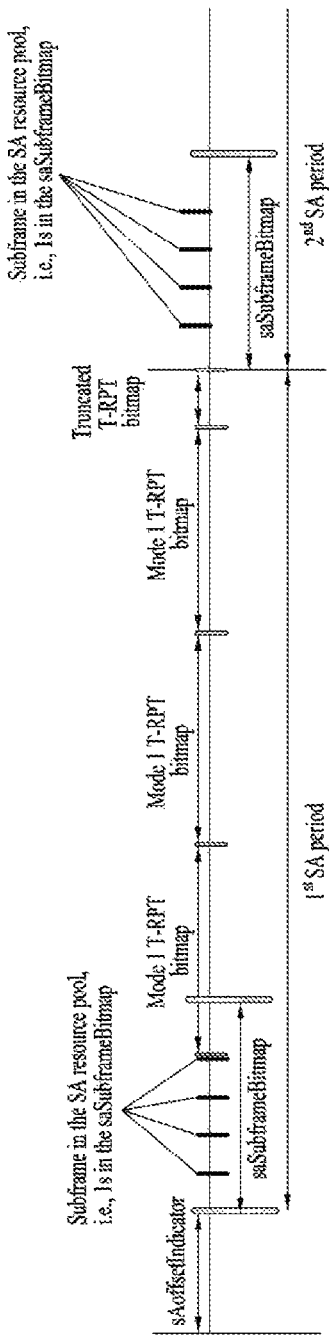
FIG. 9 is a view illustrating a scheduling assignment (SA) period

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Figure 10:
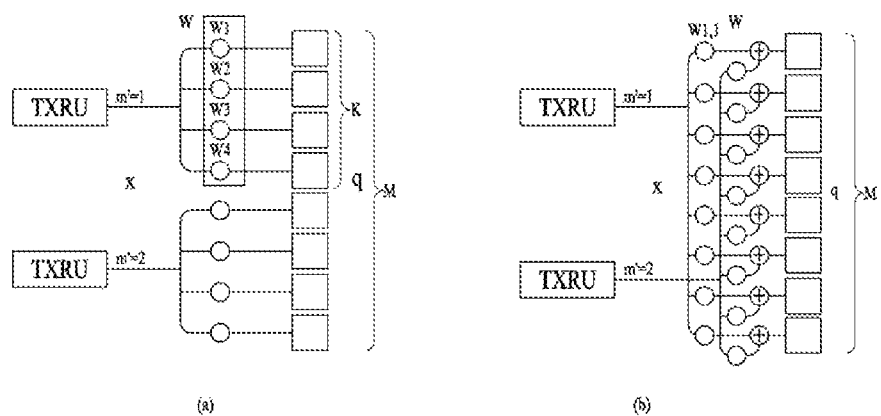
FIG. 10 illustrates examples of a connection scheme between TXRUs and antenna elements.

FIG. 10 illustrates examples of a connection scheme between TXRUs and antenna elements.

FIG. 10 (a) illustrates that TXRU is connected to a sub-array. In this case, the antenna elements are connected to only one TXRU. Unlike FIG. 10 (a), FIG. 10 (b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
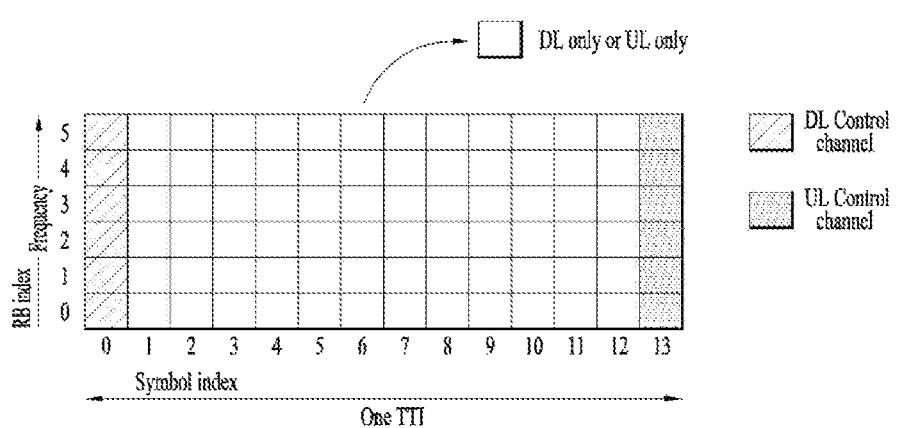
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
    downlink control period+downlink data period
    downlink control period+GP+uplink data period+uplink control period
    downlink control period+GP+uplink data period In 5G NewRAT, a signal transmissions scheme may differ according to services or requirements. For example, a transmission time unit of enhanced mobile broadband (eMBB) may be relatively long and a transmission time unit of ultra-reliable and low latency communication (URLLC) may be relatively short.

According to a service type, particularly, in the case of an urgent service, a URLLC signal may be transmitted on a corresponding resource even in the middle of eMBB transmission. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G NewRAT may consider performing retransmission in a CB unit, rather than in a transport block (TB) unit.

Figure 12:
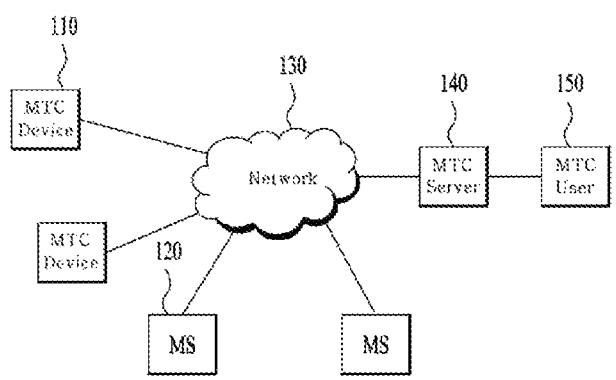
FIG. 12 shows one example of a communication scenario for MTC.

Referring to FIG. 12, an MTC device 110 is connected to a network 130 together with an existing UE 120. An MTC server 140 receives information of the MTC device 110 through the network 130 and provides the information to an MTC user 150. The MTC server 140 may be directly connected to the network 130. Alternatively, the MTC server 140 may be connected to the network 130 via Internet Protocol (IP). The above structure is just one example, and may be modified into various forms. For example, the MTC device 110 may communicate with another MTC device directly without the MTC server 140. When the MTC device 110 is deployed on the network 130, traffic load put on the network 130 may increase according to the traffic property of the MTC device 110. This may cause a problem of degrading a service for the existing UE 120. Therefore, in order to reduce the traffic load due to the MRC device 110, it is necessary to flexibly manage the resource allocation of the MTC device 110 according to the traffic property of the MTC device 110 and/or the current network congestion.

MTC may be introduced in 3GPP LTE-A or IEEE 802.16. Service requirements different from those for legacy terminals are required for MTC devices to operate on existing networks. Service requirements include common service requirements and specific service requirements. For the service requirements of MTC for 3GPP LTE-A, see Chapter 7 of 3GPP TS 22.368 V10.0 (2010 March) "3rd Generation Partnership Project; Technical Specification Group Services and System Aspects; Service requirements for Machine-Type Communications (MTC); Stage 1 (Release 10)". The service requirements of MTC in IEEE 802.16 are discussed in IEEE 802.16p. The following description is made by focusing on MTC introduced for 3GPP LTE-A, by which the present disclosure is non-limited.

Not all MTC devices need to have the same characteristics, as MTC devices may exist in a variety of fields. That is, not all system optimizations need be suitable for all MTC devices. The MTC characteristics are defined to provide a structure for the different system optimization possibilities that may occur. These MTC characteristics can be provided on a subscription basis. In addition, the MTC characteristics may be activated individually. Specific service requirements among MTC characteristics may include the characteristics such as low mobility, time controlled, time tolerance, MTC monitoring, offline indication, Priority Alarm Message (PAM), extra low power consumption, secure connection, etc.

MTC devices have different characteristics from those of Human Type Communication (HTC) devices, and existing radio communication systems optimized for HTC devices can be inefficient in supporting MTC devices. Thus, for the MTC devices, a method of allocating dedicated radio resources different from radio resources allocated to HTC devices is required.

Specifically, in the case of UE operation BW reduction, the corresponding MTC UE can only be implemented in a form that is capable of a signal transmitting/receiving operation for a predetermined BW (e.g., 1.4 MHz or 6 RBs) smaller than the actual system BW (e.g., 20 MHz or 100 RBs) in terms of Radio Frequency (RF) and/or Baseband (BB) signal processing. With a minimum of 6 RBs of a system BW for the MTC UE, the MTC UE receives and/or detects existing PSS/SSS/PBCH so that it can advantageously discover and/or detect a cell to which the MTC UE will connect.

For example, an MTC device, regardless of the cell's system bandwidth, may use only the reduced band, i.e., the subband. For example, a DL system bandwidth of a cell is divided into several subbands in a predetermined size unit (e.g., unit of 1.4 MHz or unit of several RBs), and an MTC device can receive a downlink channel only on one of the several subbands. Similarly, it is possible to divide a cell's uplink system bandwidth into several subbands in a predetermined size and allow an MTC device to transmit an uplink channel only on one of the several subbands.

In general, uplink resources for an MTC device are pre-set by a base station. The MTC device may transmit uplink using an up link resource configured by the base station. In this case, the MTC device may be allocated with an uplink resource for a particular subband in a cell system bandwidth by the base station and transmit its own uplink signal using the allocated resource.

Narrowband TX from P-UE

As described above, (limited bandwidth-based) MTC and NB-IoT device communication using the existing uplink between a base station and a UE may not be efficient in terms of battery consumption as many repetitive transmissions are required to secure (communication) coverage. On the other hand, a sidelink-based communication operation is performed in a relatively short distance, which may be useful in terms of battery consumption (owing to relatively fewer repetitive transmission requirements).

In addition, in this disclosure, a UE may not perform a receiving (and sensing) action operation simultaneously while performing random selection of transmission resources in terms of mitigating battery consumption. In this case, the UE may randomly (arbitrarily) select a transmission resource on which a transport block of the UE will be transmitted. As an example, a UE may randomly select a prescribed frequency band from a plurality of preset frequency bands. Here, a plurality of the preset sections are the sections generated from dividing a system band into preset frequency intervals. And, for example, the preset frequency intervals may be set in advance based on a size of a transport block transmitted by the UE.

If a UE does not perform a receiving (and sensing) action simultaneously while performing a random selection of a transmission resource, it does not need to keep its TX AMP on to work to a system bandwidth (e.g., 50 RBs) in terms of battery consumption mitigation. For example, if a size of the SA and DATA transmission related resource block (RB SIZE) is 6 RBs, the UE may have a 6-RB bandwidth like a NARROW BANDWIDTH LIMITED UE (e.g., MTC, NB-IOT). In this case, the UE may turn on its own transmission amplifier (TX AMP) and perform a transmission operation on a frequency region corresponding to the above bandwidth, which may be useful in terms of reducing battery consumption. Meanwhile, for clarity, the UE performing the above operation shall be defined as a PEDESTRAIN UE (P-UE) and described later.

The present disclosure presents additionally proposes methods for efficiently supporting the P-UE transmission operation in the form described above. For example, the proposed methods of the present disclosure may be extended and applied for a transmitting (or receiving) operation of a UE having TX (or RX) bandwidth capability smaller than that of a system bandwidth (or, a UE performing a transmitting or receiving operation with an RB size smaller than a system bandwidth).

Specifically, in case of a UE that turns on the transmission amplifier (TX AMP) only for a bandwidth size (hereinafter TXON_BAND) smaller than the overall system bandwidth like the P-UE, the UE requires an RF CHAIN (or center frequency) RF-TUNING time when TXON_BAND (or the frequency band) switching is performed. For example, if there is a sufficient time interval between randomly selected resources for different Transport Block (TB) transmission (or initial transmission/retransmission of the same TB), hopping between resources may be performed appropriately (without resource loss/overhead due to RF-TUNING). However, since resource selection is performed randomly, such a time interval cannot always be sufficiently guaranteed. In this regard, a method is needed to ensure a sufficient time interval between randomly selected resources, even if the selection of resources is selected randomly.

Moreover, like the above-described P-UE, if the transmission operation is performed by turning on the transmission amplifier (or TX AMP) for the TXON_BAND (or the single frequency band) only (e.g., if transmission is performed on the full TXON_BAND), a leakage into a frequency resource region adjacent to the corresponding TXON_BAND. In this regard, a method of minimizing leakage into the frequency resource region adjacent to the corresponding TXON_BAND is required as well. That is, if the transmission amplifier is turned on only for the transmission band corresponding to the frequency band, it is necessary to secure RF-tuning time according to frequency hopping and the problem of out-band leakage between adjacent frequency bands needs to be solved. A method for solving those problems shall be described later.

Resource Loss/Overhead Handling Method Required in Performing Re-Tuning

For clarity of the following description, initial transmission and retransmission (or different TB transmission) of the same Transport Block (TB) shall be described in a manner of being defined as TX #A and TX #B, respectively.

According to one example, the UE (or P-UE) may randomly select a transmission timing of TX #A and TX #B related resources by leaving a previously set (or signaled) 'minimum time interval'. Here, the 'minimum time interval' may be specified to be equal to or greater than an RF-tuning time required for TXON_BAND switching.

When there is no limitation put on the minimum time interval, if a time interval between TX #A and TX #B resources is smaller than the minimum time interval, a random selection range on a frequency region can be restricted. Particularly, if the time interval between the TX #A and TX #B resources is smaller than the minimum time interval, when the same Resource Block (TB) is initially transmitted/retransmitted, the TX #A and TX #B resources may be set to be selected limitedly (randomly) within the same TXON_BAND (or frequency band) only. For example, the aforementioned method may be limitedly applicable only if an interval between time resources selected after randomly selecting TX #A/B related time resource (e.g., subframe) is smaller than a previously set (/signaled) threshold (e.g., a re-tuning time).

The two methods mentioned in the above description may be applicable in a manner of being modified as follows. First of all, a transmission resource of a P-UE is not selected by the P-UE. Instead, a resource is selected by applying the above methods on a network and then the P-UE is informed of the selected resource Out-Band Leakage Handling Method A UE (or P-UE) may randomly select a prescribed frequency band (TXON_BAND) from a plurality of frequency bands (or a plurality of TXON_BANDs) generated from dividing a system band in unit of the TXON_BAND (or a preset frequency interval) and determine a transmission resource based on the randomly selected frequency band. Yet, in case that the UE determines a transmission resource by randomly selecting a prescribed frequency band from a plurality of the frequency bands divided in unit of TXON_BAND, it may cause a problem of out-band leakage between the randomly selected frequency band and an adjacent frequency band. To solve such a problem, for example, it is necessary to form a guard band between the adjacent frequency bands (or, TXON_BAND and a specific method of forming a guard band is proposed as follows.

Similarly to the LTE specifications, a unit of a Resource Block (RB) transmitted by a UE may be restricted in form of a multiple of a specific prime number or a multiplication of multiples of specific prime numbers (e.g., for the purpose of FFT implementation facilitation). In this case, a guard band may be naturally formed within TXON_BAND (or frequency band). For example, when a size of TXON- _BAND (or frequency band) is determined as 9 RBs, a UE may use 6 RBs, which is a maximum integer value satisfying 'W=2X*3Y*5Z≤7 (where X/Y/Z is an integer greater than 0) among 7 RBs except 2 RBs used for SA transmission, for the usage of data transmission. Namely, the remaining 1 RB may be used as a guard band.

Or, a BS may configure a resource pool in a manner that a plurality of narrow band (sub)pools in size of TXON_BAND are spaced apart from each other in a guard band interval (on a frequency axis).

Or, in order to mitigate leakage, a UE may perform a transmission operation using a resource size (within TXON_BAND) smaller than a previously configured (/signaled) threshold. For example, if a TXON_BAND size is 6 RBs, restriction may be put in a manner that up to maximum 5 RBs are usable (here, the remaining 1 RB plays a role as a sort of a guard band).

Or, it may be able to apply a method of deploying UEs, which use a resource size equal to or greater than a previously configured (/signaled) threshold, in a manner that the deployed UEs are not adjacent to each other. For example, restriction may be put on as follows. First of all, if TXON_BAND is 6 RBs and TXON_BAND #X and TXON_BAND #Y, which are prescribed TXON_BAND, are adjacent to each other, when a prescribed UE uses 6 RBs of TXON_BAND #X, the adjacent TXON_BAND #Y may be selected by a UE using 5 RBs only. Meanwhile, the corresponding (scheduling) information may be signaled by a network.

Figure 13:
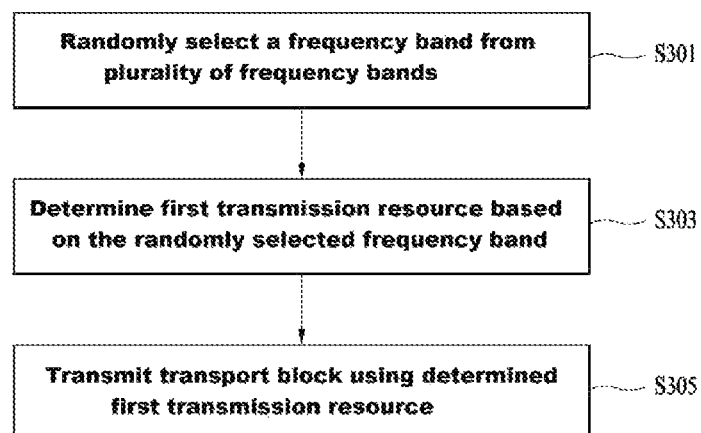
FIG. 13 is a flowchart to describe a method for a UE to randomly select a transmission resource.

FIG. 13 is a flowchart to describe a method for a UE to randomly select a transmission resource.

UEs (or P-UEs) may perform transmission operations only without performing receiving and sensing operations to minimize power consumption. In this case, a UE may randomly select a transmission resource for transmitting a transport block based on a frequency band randomly selected from a plurality of preset frequency bands (or a plurality of TXON_BANDs).

Referring to FIG. 13, a UE (or P-UE) may randomly select a frequency band from a plurality of the preset frequency bands [S301] and determine a first transmission resource that is a transmission resource to transmit the transport block based on the randomly selected frequency band. Namely, the UE may select at least one resource block from resource blocks included in the randomly selected frequency band and determine it as the first transmission resource [S303].

Meanwhile, the UE (or P-UE) may determine a frequency band, which corresponds to the randomly selected frequency band, as a transmission bandwidth. In this case, the UE may adjust an ON section of a transmission amplifier (TX AMP) to have a bandwidth for the determined transmission bandwidth.

According to one embodiment, in the randomly selected frequency band, a guard band that is a frequency band not selected as the first transmission resource may be formed. The guard band may be formed with restriction of a size of a transmission resource that will be used to transmit the transport block by the UE (or P-UE). Particularly, the size of the first transmission size may be restricted to have a size smaller than that of the randomly selected frequency band. In this case, a resource block for a prescribed frequency band in the randomly selected frequency band is not used as the first transmission resource, and the prescribed frequency band having the unused resource block may become a guard band for preventing out-band leakage.

Here, the guard band may be located on at least one of a lower band or an upper band of the randomly selected frequency band. Particularly, the UE (or P-UE) may determine a resource block contiguous within the randomly selected frequency band as the first transmission resource. In this case, the guard band may be located on at least one of the lower band and the upper band of the randomly selected frequency band. For example, if a size of the randomly selected frequency band is 6 RBs and a size of the first transmission resource is 5 RBs, the UE may determine 5 contiguous RBs among the 6 RBs as the first transmission resource only. In this case, 1 RB unused as the first transmission resource is located for a prescribed one of the lower band and the upper band of the randomly selected frequency band and the unused 1 RB becomes a guard band to prevent out-band leakage. Thus, with the restriction of the size of the first transmission resource only, the guard band may be formed on one of the lower band and the upper band of the randomly selected frequency band.

Or, if a size of the resource block uses a size of a resource block as a unit, a guard band may be formed within the randomly selected frequency band by restricting the size of the resource block into a multiplication of a prime number or a multiplication between multiples of a plurality of prime numbers. For example, when a size of a preset frequency band (or a size of a frequency band) is set to 9 RBs, a UE (or P-UE) may use 6 RBs, which is a maximum integer value satisfying 'W=2X*3Y*5Z≤7 (where X/Y/Z is an integer greater than 0) among 7 RBs except 2 RBs that are two resource blocks for a control information channel including data transmission related scheduling information, for the usage of data transmission. Namely, the remaining 1 RB may be formed as a guard band.

Or, the guard band may be formed only in at least one of a plurality of the frequency bands. Particularly, a plurality of the frequency bands may include at least one first frequency band having the size of the first transmission resource restricted and at least one second frequency band having the size of the first transmission size not restricted.

Or, the first frequency band and the second frequency band may be located in a manner of crossing with each other. For example, if a size of each of a plurality of the frequency bands is 6 RBs and a frequency band X (TXON_BAND #X) and a frequency band Y (TXON_BAND #Y), which are prescribed frequency bands, are adjacent to each other, when a prescribed UE uses 6 RBs of the frequency band X having the size of the transmission size not restricted, only the adjacent frequency band Y may be randomly selected by a UE using 5 RBs only.

Or, a guard band may be designated in advance by a higher or physical layer signal of a BS. When configuring a plurality of the frequency bands, the BS has a guard band included in each of the frequency bands and may forward information on the included guard band to the UE.

Particularly, the BS may designate (or configure) a guard band, which restricts each of a plurality of the frequency bands from being selected as the first transmission resource, in advance. For example, when configuring a plurality of resource pools for the UE, the BS may configure a resource pool corresponding to each of a plurality of the frequency bands in advance in a manner that the resource pool is spaced apart in a guard band interval (on a frequency resource axis). As described above, the previously designated (or configured) guard band may be located at least one of a lower band and an upper band of the randomly selected frequency band.

Meanwhile, the transmission resource may include 2 resource blocks for a control information channel including data transmission related scheduling information.

According to one embodiment, a UE (or P-UE) may determine a first transmission resource that is a transmission resource to transmit the transport block (hereinafter, a first transport block) and a second transmission resource that is a transmission resource to transmit a transport block (hereinafter, a second transport block) equal to or different from the former transport bock. The UE may determine each frequency band for each of the first and second transmission resources by the aforementioned method of randomly selecting a frequency band and then randomly select a transmission timing of each of the first and second transmission resources. In this case, the UE may randomly select the transmission timings within a range in which an interval between the transmission timing of the first transmission resource and the transmission timing of the second transmission resource becomes equal to or greater than a preset interval. Here, the preset interval is set to a time, which is equal to or greater than an RF-tuning time required for switching an ON section of an transmission amplifier for different frequency bands, in advance.

Or, if the interval between the randomly selected transmission timing of the first transmission resource and the randomly selected transmission timing of the second transmission resource is smaller than a preset interval, the UE (or P-UE) may randomly select the timings iteratively in a manner that the transmission timings of the first and second transmission resources becomes equal to or greater than the preset interval. Namely, the UE may randomly select the transmission timings iteratively until the transmission timings of the first and second transmission resources, which have the transmission timing interval equal to or greater than the preset interval are randomly selected.

Or, although the interval between the randomly selected transmission timing of the first transmission resource and the randomly selected transmission timing of the second transmission resource is smaller than the preset interval, the UE (or P-UE) may not change the randomly selected transmission timings. Yet, in this case, it is able to solve the problem due to failing to secure the RF-tuning time according to the frequency hopping in a manner that a frequency band of the first transmission resource and a frequency band of the second transmission resource are determined equally. Particularly, after a prescribed frequency band has been randomly selected from a plurality of frequency bands, it is able to determine the first transmission resource and the second transmission resource based on the randomly selected frequency band. Namely, the second transmission resource may be determined within a frequency band equal to a frequency band randomly selected for the first transmission resource.

Subsequently, the UE (or P-UE) may transmit the first transport block and the second transport block using the first transmission resource and the second transmission resource determined to correspond to the randomly selected frequency bands and the randomly selected transmission timings.

Figure 14:
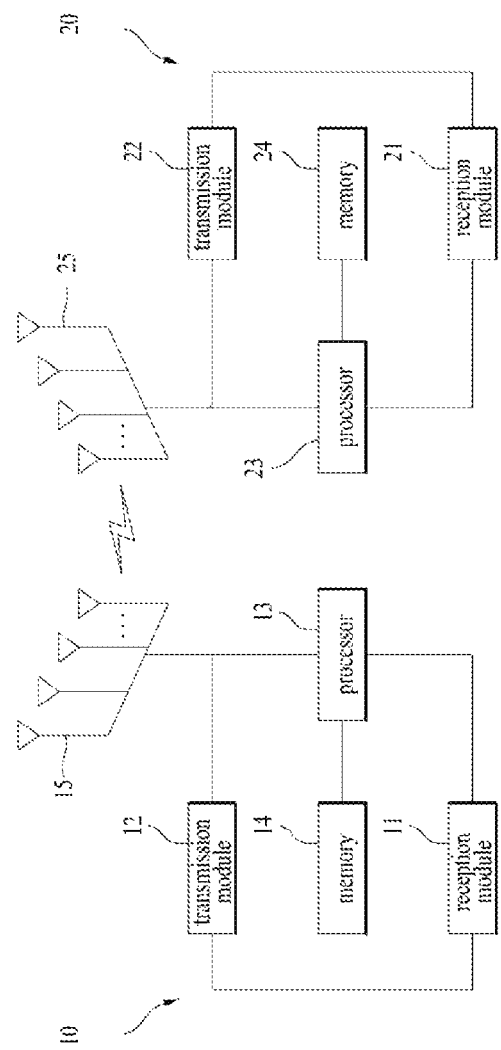
FIG. 14 is a diagram schematically showing a User Equipment (UE) performing D2D communication.

FIG. 14 is a diagram schematically illustrating a terminal performing D2D communication.

With continued reference to FIG. 14, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. Or/and receiver 21 may transmit a D2D signal (sidelink signal) to the other UE. The transmitter 22 may transmit various UL signals, data, and information to an eNB. Or/and transmitter 22 may transmit a D2D signal (sidelink signal) to the other terminal. The processor 23 may provide overall control to the UE 20.

The processor 23 of the UE 20 according to an embodiment of the present invention can process the necessary items in each of the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 14, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of selecting a transmission resource for a transport block (TB) by a user equipment (UE) in a wireless communication system, the method comprising:
   selecting a first transmission resource for transmitting the TB in a first narrowband limited to a bandwidth narrower than a system bandwidth;
   selecting a second transmission resource for transmitting the TB in a second narrowband limited to a bandwidth narrower than the system bandwidth;
   performing initial transmission of the TB using the first transmission resource; and
   performing repeated transmission for the TB using the second transmission resource,
   wherein the second transmission resource and the first transmission resource are selected to have a time interval equal to or greater than a preconfigured time interval from each other.

2. The method of claim 1, wherein a guard band is formed in the first narrowband and the second narrowband by limiting a number of selectable resource blocks for the first transmission resource and the second transmission resource.

3. The method of claim 2, wherein the number of selectable resource blocks corresponds to a value obtained by multiplying a size of one resource block by a multiple of a prime number or a multiplication of multiples of a plurality of prime numbers.

4. The method of claim 1, wherein the first transmission resource comprises two resource blocks for a control information channel including data transmission related scheduling information.

5. The method of claim 1, wherein the second transmission resource and the first transmission resource are randomly selected.

6. The method of claim 1, wherein the first narrowband is a band different from the second narrowband.

7. The method of claim 1, wherein the preconfigured time interval is determined based on a Radio Frequency (RF) tuning time.

8. The method of claim 1, wherein the first narrowband, the second narrowband, and the guard band are determined by a control signal of a physical layer or a higher layer signal transmitted from a base station.

9. The method of claim 1, wherein the transmission bandwidth for the UE is limited to the first narrowband or the second narrowband.

10. A user equipment (UE) in selecting a transmission resource for a transport block (TB) in a wireless communication system, the user equipment comprising:
    a transmitter; and
    a processor configured to select a first transmission resource for transmitting the TB in the first narrowband limited to a bandwidth narrower than a system bandwidth, select a second transmission resource for transmitting the TB in a second narrowband limited to a bandwidth narrower than the system bandwidth, perform initial transmission the TB using the first transmission resource, and perform repeated transmission for the TB using the second transmission resource by controlling the transmitter,
    wherein the second transmission resource and the first transmission resource are selected to have a time interval equal to or greater than a preconfigured time interval from each other.

11. The UE of claim 10, wherein the processor is configured to receive a user input to switch the drive mode from an autonomous mode to a manual mode, or to switch from a manual mode to an autonomous mode.

12. The method of claim 2, wherein when a number of selectable resource blocks as the first transmission resource for the first narrowband is not limited, a third narrowband adjacent to the first narrowband is configured to limit the number of selectable resource blocks as transmission resources.

* * * * *